US012654185B2

(12) United States Patent
Mitchell et al.

(10) Patent No.: US 12,654,185 B2
(45) Date of Patent: Jun. 16, 2026

(54) MIX ON EXIT SPRAYER

(71) Applicant: THE FOUNTAINHEAD GROUP, INC., New York Mills, NY (US)

(72) Inventors: George Mitchell, Utica, NY (US); Andrew C. Putrello, Utica, NY (US)

(73) Assignee: THE FOUNTAINHEAD GROUP, INC., New York Mills, NY (US)

( * ) Notice: Subject to any disclaimer, the term of this patent is extended or adjusted under 35 U.S.C. 154(b) by 267 days.

(21) Appl. No.: 17/991,974

(22) Filed: Nov. 22, 2022

(65) Prior Publication Data

US 2023/0158524 A1 May 25, 2023

Related U.S. Application Data

(60) Provisional application No. 63/281,933, filed on Nov. 22, 2021.

(51) Int. Cl.
*B05B 7/24* (2006.01)

(52) U.S. Cl.
CPC .................................. *B05B 7/2464* (2013.01)

(58) Field of Classification Search
CPC .................................................... B05B 7/2464
USPC .......................................................... 239/398
See application file for complete search history.

(56) References Cited

U.S. PATENT DOCUMENTS 2,750,231 A 6/1956 Cox
4,432,470 A * 2/1984 Sopha ...................... B01J 4/008 239/398
4,433,577 A * 2/1984 Khurgin .................... G01F 1/52 73/216
4,434,056 A * 2/1984 Keefer ................... B01D 61/06 210/652
4,436,493 A * 3/1984 Credle, Jr. ............ F04B 39/044 91/347
4,437,812 A * 3/1984 Abu-Shumays ....... G01N 30/36 417/442
4,440,314 A * 4/1984 Vetter ..................... B01F 35/83 222/61
4,445,470 A * 5/1984 Chmielewski ......... F01M 11/10 123/73 AD
5,502,685 A 3/1996 Orlando
10,167,863 B1 1/2019 Cook et al.
11,154,887 B2 * 10/2021 Obrist ............... B05C 17/00579
2007/0264138 A1 11/2007 Mandell et al.
2018/0236472 A1 8/2018 Villar Cloquell et al.
2019/0030554 A1 1/2019 Mantes et al.
2019/0388918 A1 12/2019 Gustafson et al.

OTHER PUBLICATIONS

International Search Report and Written Opinion of PCT/US22/05662, filed Nov. 22, 2022, pp. 1-8. Mailing date of Search Report Feb. 28, 2023.

* cited by examiner

*Primary Examiner* — Chee-Chong Lee
(74) *Attorney, Agent, or Firm* — BOND, SCHOENECK & KING, PLLC; George R. McGuire

(57) ABSTRACT

A mix on exit sprayer having a water tank and a body the includes a chemical cartridge receiving cavity. A pump move water from the tank to a mixing chamber and a piston drives chemical concentrate from the cartridge into the mixing chamber. A venturi style mixing element mixes the water and concentrate and the pump moves the mixed fluid from the mixing chamber to a spray wand from which it can be expelled.

2 Claims, 5 Drawing Sheets

MIX ON EXIT SPRAYER

CROSS-REFERENCE TO RELATED APPLICATION

The present application relates and claims priority to U.S. Provisional Patent Application Ser. No. 63/281,933, filed Nov. 22, 2021, the entirety of which is hereby incorporated by reference.

GOVERNMENT FUNDING

N/A

FIELD OF THE INVENTION

The present disclosure is directed generally to sprayers and more particularly to as a type of sprayer referred to as a mix on exit sprayer which mixes a chemical concentrate with water within the sprayer unit prior to the mixture being expelled from the sprayer.

BACKGROUND

Sprayers are used to dispense a mixture of water and chemicals for a variety of purposes, such as herbicide, pesticide, fertilize and insecticide treatments. Some sprayers contain a tank in which a pre-mixture of water and chemicals are stored and from which the mixture is pumped through a spray wand. Other sprayers may provide a fluid pathway for water and a separate pathway for the chemical and have the them mix together just before expelling them through a spray wand; these are referred to as mix on exit sprayers.

An advantage of mix on exit sprayers is that a user can simply buy replacement chemical cartridges that attach to the sprayer (or a hose) rather than having to purchase the pre-mixed chemicals each time one is finished. Another advantage is that some mix on exit sprayers allow for metering of the amount of chemical added into the water stream, thereby having the capability to expel a chemical mixture of varying strengths.

One potential disadvantage of the mix on exit sprayers is the user handling of the chemicals, potentially exposing them to a hazardous substance. In addition, the metering mechanisms are sometimes not properly calibrated or become uncalibrated over time, leading to inaccurate treatments.

Accordingly, there is a need in the art for a mix on exit sprayer that minimizes user contact with the chemicals, as well as one that minimizes the risks of inaccurate dosing.

SUMMARY

The present disclosure is directed to a mix on exit sprayer.

According to an aspect is a mix on exit sprayer, comprising a tank in which water is adapted to be stored; a cavity in which a chemical filled cartridge is adapted to be removably positioned; a mixing compartment adapted to receive and mix the chemicals from the cartridge with the water from the tank and creating a chemical and water mixture; a first fluid pathway extending from the tank in which the water is adapted to be stored to the mixing compartment; a mechanism for moving chemicals from the cartridge into the mixing compartment; a spray wand attached to the tank; a second fluid pathway extending from the mixing compartment to the spray wand; and a pump for moving the chemical mixture from the mixing compartment through the second fluid pathway and into the spray want.

According to an embodiment, the mix on exit sprayer further comprises a power source attached to the pump.

According to an embodiment, the mechanism is a piston adapted to linearly move into the cartridge at a predetermined rate of speed.

According to an embodiment, the mix on exit sprayer further comprises an electric motor powered by a power source and operably connected to the pump.

According to an embodiment, the electric motor connects to provides power to the piston.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes a mix on exit sprayer 10.

Figure 1B:
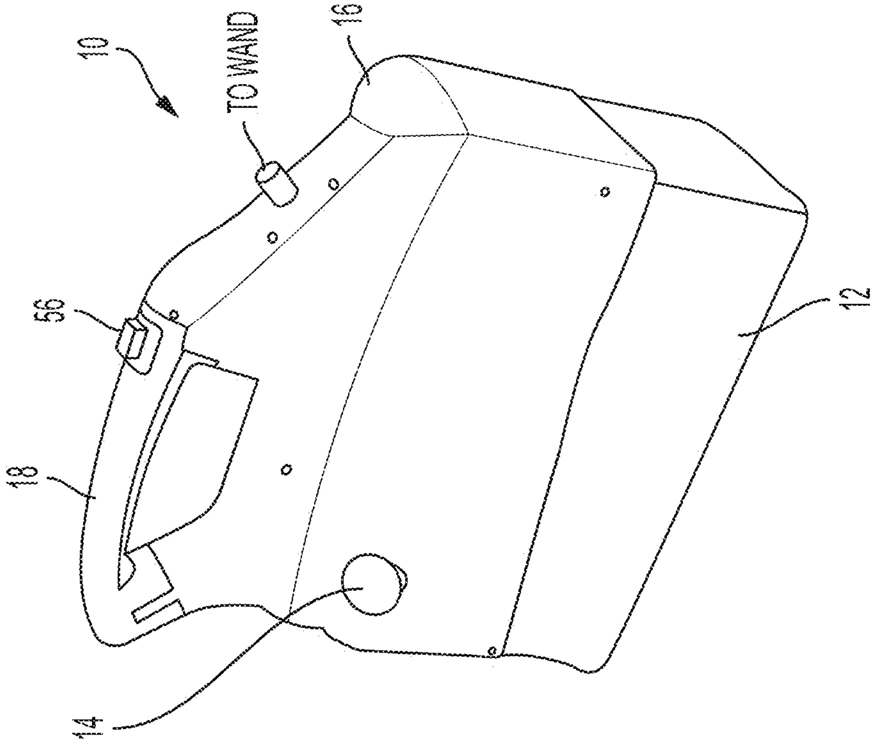
FIGS. 1A and 1B are perspective views of a mix on exit sprayer, in accordance with an embodiment.
Figure 1A:
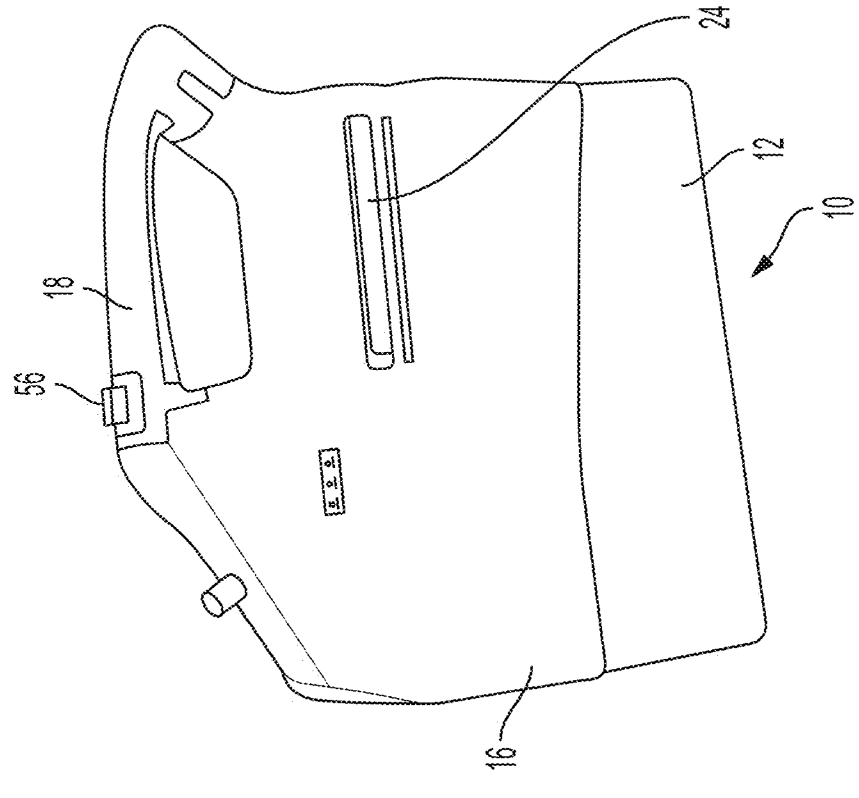
Figure 2C:
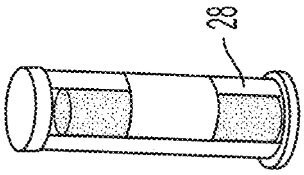
FIG. 2C is a perspective view of a chemical cartridge for use with a mix on exit sprayer, in accordance with an embodiment.
Figure 2B:
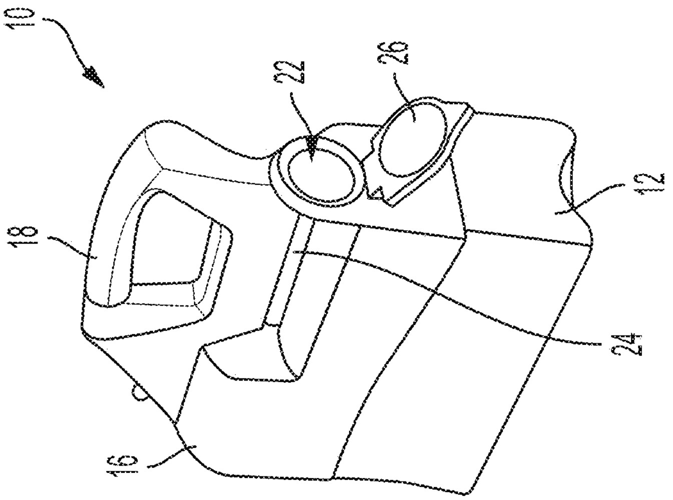
FIGS. 2A and 2B are perspective views of a mix on exit sprayer, in accordance with an embodiment.
Figure 2A:
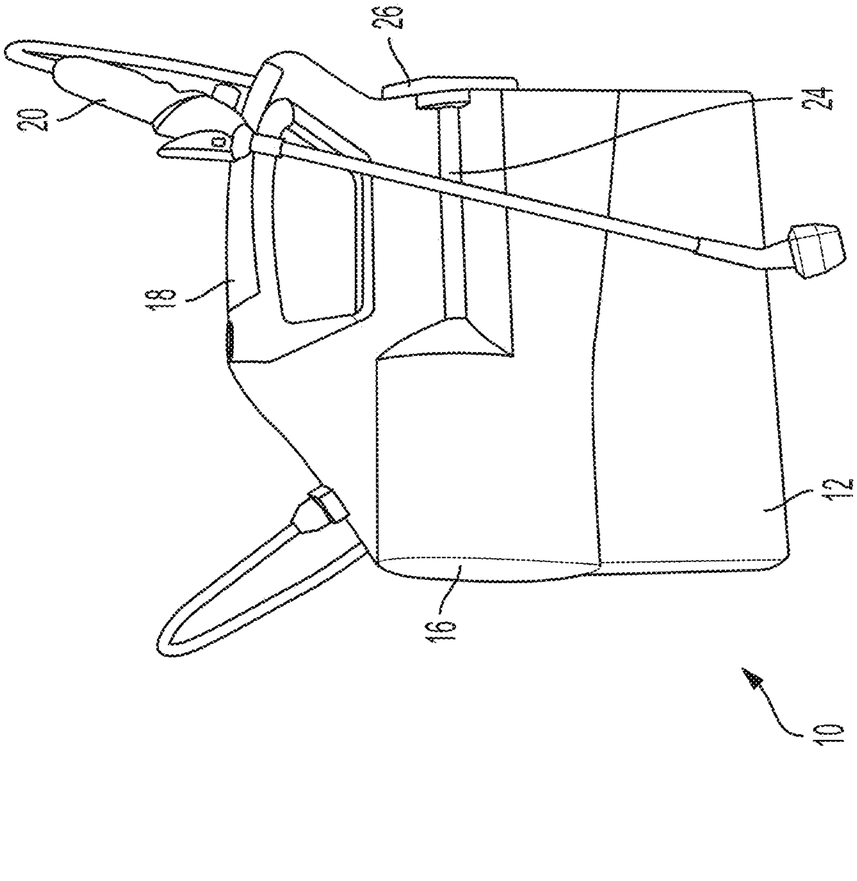
Figure 3:
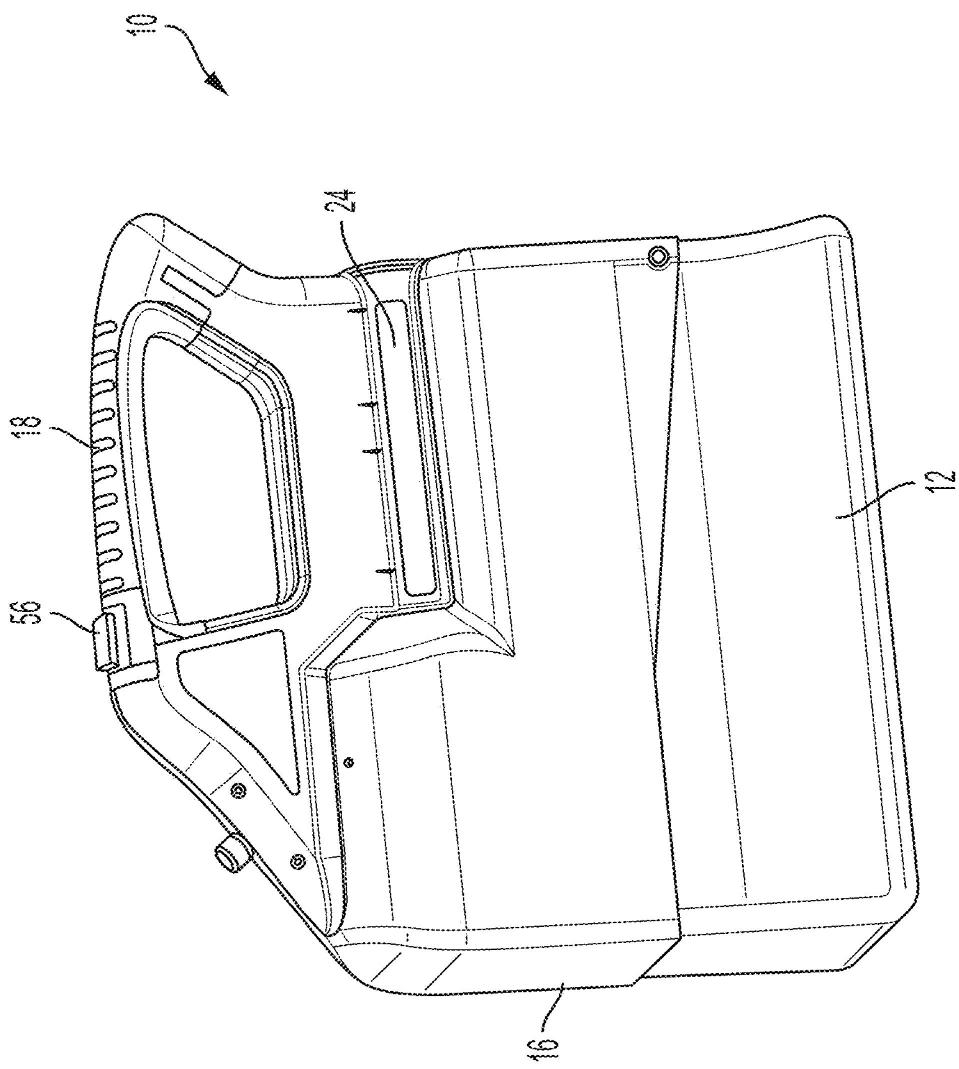
FIG. 3 is a perspective views of a mix on exit sprayer, in accordance with an embodiment.
Figure 4:
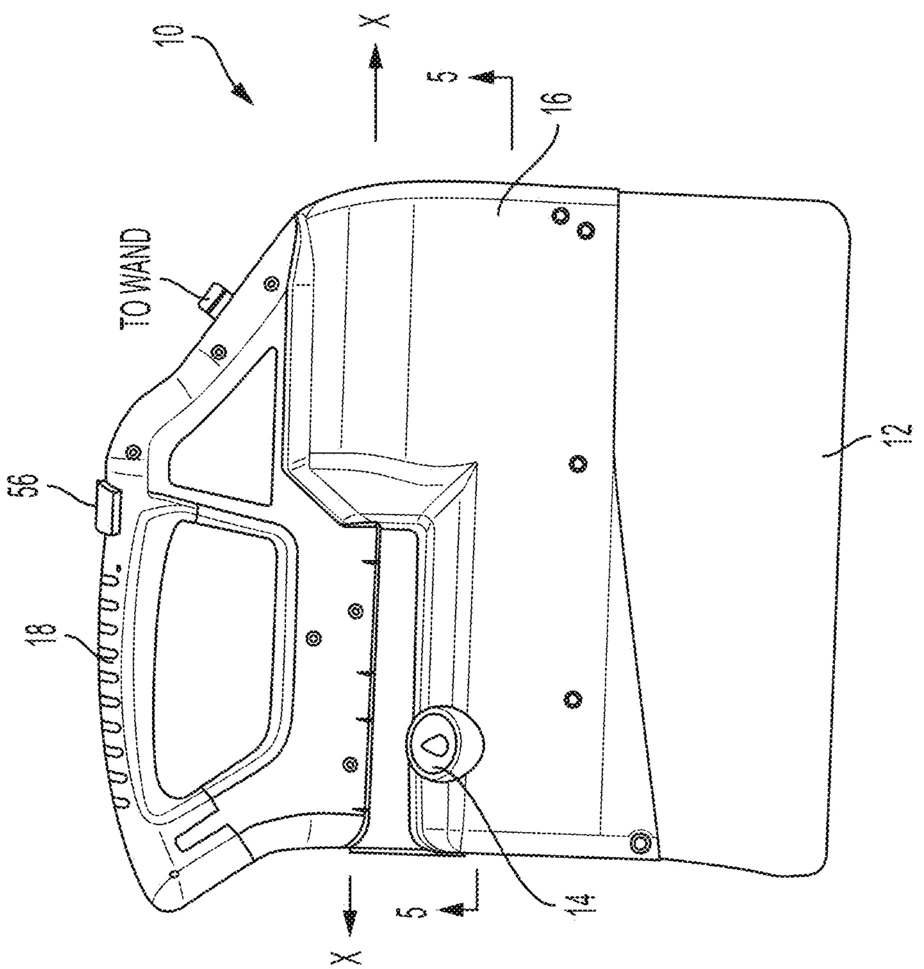
FIG. 4 is a perspective view of a mix on exit sprayer, in accordance with an embodiment.

Referring to FIG. 1, in one embodiment, mix on exit sprayer 10 generally comprises a water tank 12 having a manually accessible fill opening 14, a body 16 attached to (or integral with) tank 12 and having a handle 18 formed along the top edge thereof, and a spray wand 20 attached to body 16 in proximity to the forward region thereof. A chemical cartridge receiving cavity 22 is formed in the back side of body 16, and a cartridge fill gauge 24 in the form of a viewing window is formed in the body's side surface extending along the length of the cavity 22. A hinged door 26 covers the cavity 22 when in use and is able to be moved to open it to remove a spent cartridge and/or insert a new cartridge. In use a chemical cartridge 28 is inserted into cavity 22 and, as will be described hereinafter, the chemical contents of the cartridge 28 will be mixed with water prior to the mixed stream being expelled from the sprayer via wand 20. In the disclosed embodiment, cavity 22 and cartridge 28 are cylindrical, but other shapes could also be employed.

In the disclosed embodiment, tank 12 and body 16 are shown as two separate pieces of the assembly. Body 16 includes a ridge 30 on its lower edge that is shaped to securely engage with a groove 32 formed in tank 12 allowing the two pieces to fit together and form a unitary sprayer. All of the mechanical/electrical elements of sprayer are contained within body 16. The two pieces can be assembled at the time of manufacture without the user having the ability to disassemble; alternatively, the two pieces could be made to permit manual assembly/disassembly.

Figure 5:
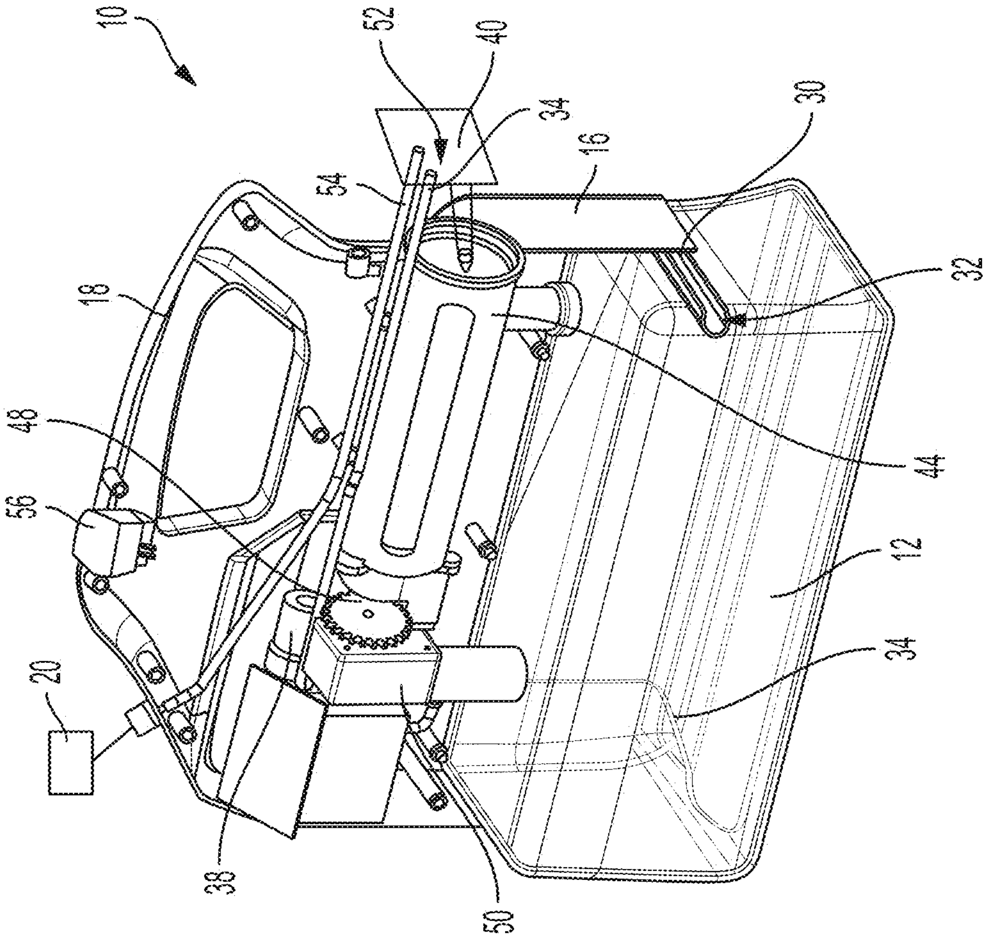
FIG. 5 is a cross-sectional view of a mix on exit sprayer taken along section line 5-5 of FIG. 4, in accordance with an embodiment.

Referring to FIG. 5, the mechanical and electrical components that facilitate operation of sprayer 10 can be seen. With regard to one part of the fluid circuit, a dip tube 34 extends through body 16 and to the bottom of tank 12. A pump 36 electrically powered via a power source 38, such as a battery, contained within body 16 provides the pumping action necessary to pull water from tank 12 through dip tube 34. Dip tube 34 extends through body 16 and into a mixing chamber 40 (shown schematically in FIG. 5) where water pulled from tank 12 exits the tube 34.

A cartridge frame 44 is contained within body 16 and defines cavity 22 providing rigidity to the supporting structure around cartridge 28. A slot 46 is cut out from frame 44 to provide the gauge viewing window 24. In the disclosed embodiment, cartridge frame 44 extends along a longitudinal axis that is parallel to the longitudinal axis of sprayer 10, X-X. It is possible, however, for the cartridge to be disposed at a different angle within sprayer 10.

To facilitate movement of chemical concentrate from cartridge 28, a piston 48 is driven along the length of the cartridge 28 by an electric motor 50 and pushes the concentrate out of cartridge 28 and into mixing chamber 40 where it mixes with water from tank 12. A venturi style mixing element 52 comprises part of mixing chamber 40 to conduct the mixing. Once the concentrate and water mix, a tube 54 which forms part of the fluid circuit with tube 34 extends from mixing chamber 40 to wand 20.

To achieve the desired mixing ratio of concentrate to water, each cartridge 28 that is selected has a predetermined amount of concentrate contained therein. The piston 48 moves at the same rate of speed regardless of the cartridge 28 inserted. Thus, for a lower mix ratio, a cartridge 28 with less concentrate would be used. To vary the amount of concentrate in each cartridge, the inner diameter of the cartridge can be varied (so, for example, a smaller inner diameter will have less concentrate than a cartridge with a larger inner diameter). Thus, for example:

| Cartridge concentrate quantity | Mix ratio | Piston Speed |
|---|---|---|
| Quantity 1/Inner diameter of cartridge 1 | Mix ratio 1 | 1 |
| Quantity 2/Inner diameter of cartridge 2 | Mix ratio 2 | 1 |
| Quantity 3/Inner diameter of cartridge 3 | Mix ratio 3 | 1 |

Alternatively, each cartridge 28 could contain the same amount of concentrate and the piston 48 could be driven at variable rates of speed to push more or less concentrate out while using sprayer 10. Thus, for a lower mix ratio, a slower piston speed would be selected. Thus, for example:

| Cartridge concentrate quantity | Mix ratio | Piston Speed |
|---|---|---|
| Quantity 1 | Mix ratio 1 | 1 |
| Quantity 1 | Mix ratio 2 | 2 |
| Quantity 1 | Mix ratio 3 | 3 |

A switch 56 electrically connected to the electric motor 50 permits the user to manually activate sprayer 10. When switch 46 is turned to its on position, motor 50 starts pumping the water and piston, thereby creating the necessary pressure for the chemical mixture to be expelled from wand 20.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A mix on exit sprayer, comprising:

a. a body having a first cavity having a first volume;

b. a tank in which water is adapted to be stored;

c. a second cavity having a second volume smaller than the first volume and enclosed within the body in which a chemical filled cartridge is adapted to be removably positioned;

d. a chemical filled cartridge adapted for removeable placement within the second cavity;

e. a mixing compartment adapted to receive and mix the chemicals from the cartridge with the water from the tank and create a chemical and water mixture;

f. a first fluid pathway extending from the tank in which the water is adapted to be stored to the mixing compartment;

g. an electric motor powered by a power source;

h. a piston driven by the electric motor that is positioned externally to the cartridge, the piston being co-axially aligned with and adapted to linearly move from outside the cartridge into the cartridge at a controlled constant rate and displace chemicals from the cartridge into the mixing compartment;

i. a spray wand attached to the tank;

j. a second fluid pathway extending from the mixing compartment to the spray wand; and k. a pump powered by the electric motor and fluidly coupled solely to the tank and not fluidly coupled to the cartridge and in which water is adapted to be stored and the mixing compartment and adapted for moving the chemical mixture from the mixing compartment through the second fluid pathway and into the spray l. an electronic controller that drives the piston is adapted to move at a predetermined, selectively set linear rate of speed, independent of the pump and using the motor-driven piston.

2. The mix on exit sprayer according to claim 1, wherein the second cavity includes a sight gauge to permit visual observation of the quantity of chemical left in the cartridge.

* * * * *